United States Patent [19]

Jiandani

[11] Patent Number: 4,560,105
[45] Date of Patent: Dec. 24, 1985

[54] BELLOWS-ACTUATED THERMOSTATIC STEAM TRAPS

[75] Inventor: Niranjan T. Jiandani, Emmaus, Pa.
[73] Assignee: Spirax Sarco, Inc., Allentown, Pa.
[21] Appl. No.: 688,330
[22] Filed: Jan. 3, 1985

Related U.S. Application Data

[63] Continuation-in-part of Ser. No. 569,977, Jan. 11, 1984.
[51] Int. Cl.⁴ ............................................. F16T 1/02
[52] U.S. Cl. .................................. 236/58; 236/93 A; 251/86
[58] Field of Search ..................... 236/58, 93 A, 99 F, 236/99 J, 99 R; 251/86

[56] References Cited

U.S. PATENT DOCUMENTS

| | | | |
|---|---|---|---|
| 2,975,974 | 3/1961 | Jackson et al. | 236/48 |
| 3,489,349 | 1/1970 | Hilmer et al. | 236/58 |
| 3,725,989 | 4/1973 | Reid et al. | 236/58 X |
| 4,044,791 | 8/1977 | McKenzie | 137/493.9 |

Primary Examiner—William E. Tapolcai
Attorney, Agent, or Firm—Ruth Moyerman

[57] ABSTRACT

In a bellows-actuated thermostatic steam trap (A) having a bellows (41) carrying a valve member (45) of a valve (45/22) for opening and closing the trap, the bellows is disposed between connections (20/21 and 30/31) which are identical to one another so as to be selectively connectable in a steam flow line with the valve (45/22) disposed either downstream of, or upstream of, the bellows (41). The trap includes a metal housing (11/12), the mass of which constitutes at least 70% of the mass of the trap. The trap operates, when connected with the valve disposed downstream of the bellows, in a first mode in which, in normal operation, the trap discharges condensate at a temperature close to saturated steam temperature. When connected with the valve disposed upstream of the bellows, the valve operates in a second mode in which in normal operation condensate is discharged at a temperature significantly below steam temperature. One or other of these modes can be simply obtained, merely be selecting which way round the trap is connected in a flow line.

6 Claims, 7 Drawing Figures

BELLOWS-ACTUATED THERMOSTATIC STEAM TRAPS

CROSS-REFERENCE TO RELATED APPLICATIONS

This application is a continuation-in-part of my application Ser. No. 06/569,977 filed Jan. 11, 1984 and currently pending which is entitled "Dual-Mode Bellows-Actuated Thermostatic Steam Trap".

BACKGROUND OF THE INVENTION

1. Field of the Invention

This invention relates to automatic steam traps of the type in which there is activation of a valve directly by a thermostatic element of the expanding fluid-filled type. In more general parlance, it relates to bellows-actuated thermostatic steam traps. More particularly, it relates to a trap of this character which has a dual modality of operation.

2. Description of the Prior Art

As is known to those skilled in this art, the purpose of a steam trap is to remove condensate and vent noncondensables from steam systems without losing any steam. The most efficient trap is one which accomplishes this under varying conditions of pressure and temperature.

Steam traps may be variously classified and differences of opinion exist as to the number of genre which exist and their names. For example, Gleason et al in U.S. Pat. No. 3,347,257 state that there are three general types (i.e. bucket, thermostatic or expansion, and thermodynamic). On the other hand, in "Hook-up Designs for Steam & Fluid Systems" (Sarco Company, Allentown, Pa. 7th ed - 1981, pg 16 et seq) five different types are described, namely, (1) balanced pressure thermostatic, (2) liquid expansion, (3) float and thermostatic, (4) inverted bucket and (5) thermodynamic. Each of these traps has its strengths and its weaknesses. Yet their mutual exclusivity works an economic hardship on the process plant which must stock various types for various applications.

Consider, for example, the fact that in a typical chemical process plant or oil refinery, there are two major important uses for steam traps. They are used in connection with steam tracing of product lines, which must be heated to keep their contents at desired temperature and/or viscosity. They are also used for draining condensate from steam mains. These two uses, however, require different operating characteristics. In the draining of condensate from steam mains, the condensate is removed at approximately saturation temperature even though it contains significant sensible heat. This is so because the presence of condensate is undesirable and, under some conditions, hazardous. In the draining of steam tracing lines, however, condensate is removed at temperatures well below saturation in order to achieve maximum utilization of sensible heat. Plants often stock balanced pressure thermostatic traps, for the first use and liquid expansion traps for the second use.

It would be desirable, therefore, to have a single trap which could perform functions traditional to both balanced pressure thermostatic traps and liquid expansion traps. By this it is not meant merely to have a common housing with interchangeable internals but, rather, a trap which is truly operable in a dual mode. In one of these modes, the trap would discharge condensate at a temperature close to saturated steam temperature. In the other of these modes, the discharge would be at a temperature significantly below saturated steam temperature.

The prior art in this field is legion. Still, U.S. Pat. No. 748,888 discloses a trap containing a diaphragm element and suggests inverting it to close the outlet instead of the inlet. There is no disclosure of what is achieved thereby. Smith et al, U.S. Pat. No. 1,467,818 is a conventional radiator trap, which uses a ball valve outlet and a bellows. In Oakley et al, U.S. Pat. No. 1,934,205 a trap is disclosed, which can be isolated for replacement of its thermostatic bellows. Irwin, U.S. Pat. No. 1,976,730 discloses a trap wherein blow off temperature can be adjusted over a wide range. However, despite the temperature setting, the valve still functions as a blow off trap. Smith, U.S. Pat. No. 2,229,529 controls flow of condensate in one direction and steam in another, by providing two mechanisms in a common housing. Clifford, U.S. Pat. No. 2,276,931 discloses a bellows which is unusually sensitive and requires less fluid than conventional devices. Morgan, U.S. Pat. No. 2,778,573 discloses a steam trap having a bellows and also a linked valve for providing two valving actions, if pressure increases. Reid et al, U.S. Pat. No. 3,725,989 discloses a steam trap, with a light metallic housing, which resembles embodiments of the instant invention. However, no dual mode of operation is disclosed. Further, tests have established that such traps are incapable of the requisite dual modality of operation. Beatty, U.S. Pat. No. 4,134,541 discloses a trap which combines a thermostatic bellows trap with a restrictive orifice in parallel. Cycling of the bellows, which is characteristic of blow traps, is reduced by the continuous condensate path through the orifice. Hetz, U.S. Pat. No. 4,288,032 provides a "universal" trap body into which can be placed various types of trap elements. While some of the above patents recognize the existence of the problem of need for dual applications, none postulates a solution as exemplified herein.

In addition to the foregoing prior U.S. patents, West German Offenlegungschrift No. 2,447,031 (filed Oct. 2, 1974; published Apr. 8, 1976) entitled "Condensate Trap", discloses a trap which includes a bellows having a valve member affixed thereto. By keeping the bellows immersed in a low pressure condensate reservoir, considerable freedom of trap location is stated to be achieved. However, there is no suggestion of a dual mode of operation in the context of the foregoing discussion. Bellows with valve members attached are also shown in Pamphlet 2E published by Spirax Sarco Limited, entitled "Spirax balanced-pressure thermostatic steam traps". Again, there is no suggestion of a dual mode of operation.

SUMMARY OF THE INVENTION

According to the present invention there is provided a bellows-actuated thermostatic steam trap having a metal housing, which constitutes at least 70% of the mass of the trap, within which is located a bellows carrying a part of a valve for opening and closing the trap, the bellows being disposed between connections which are identical to one another so as to be selectively connectable in a steam flow line with the valve disposed either downstream of, or upstream of, the bellows; the trap operating, when connected with the valve disposed downstream of the bellows, in a first mode in which, in normal operation, the trap discharges condensate at a temperature close to saturated steam temperature, whereas when connected with the valve disposed upstream of the bellows the valve operates in a second mode in which in normal operation condensate is discharged at a temperature significantly below steam temperature. Thus, simply by selecting which way round this trap is connected in a flow line, the trap will operate either to discharge hot condensate until the appearance of steam or to discharge condensate having a temperature well below the equilibrium temperature for saturated steam.

In a particular embodiment to be described more fully hereinafter, the trap comprises a metal housing made from two mating housing portions, which constitutes at least 70% of the mass of the trap, and which contains an internal chamber. In that chamber is located the bellows, which has opposed ends and an accordion side wall. The bellows contains a volatile liquid whose saturation curve closely parallels that of saturated steam but is a few degrees below it. A valve member is affixed to the center of one end of the bellows.

One of the mating housing portions contains a valve seat with which the valve member on the bellows cooperates. This valve seat is annular and is the terminus of a passage which extends from the exterior of the housing portion along its longitudinal axis.

The other mating housing portion contains a bore extending on its longitudinal axis from its exterior toward the center but this bore divides into a plurality of smaller offset bores which are radially distributed in a circle around the longitudinal axis. On the longitudinal axis, proximate the chamber, there is provided an attachment face.

Means are provided pivotally connecting the end of the bellows that is remote from the valve member to the attachment face of the housing so that there is self-alignment of the valve member and the valve seat as the bellows expands and contracts. These means include a sphere centrally affixed to this end of the bellows and a hollow, internally shouldered, sleeve mounted on the attachment face with the sphere being permanently but rotatably retained within the sleeve. Frictional resistance to rotation is increased by providing a spring within the sleeve, one end of which abuts the sphere.

As will be described more fully hereinafter, when the passage in the housing portion having the valve seat associated with it is used as an outlet, the trap functions in the mode in which the trap discharges hot condensate until the appearance of steam. However, if the inlet and outlet connections are reversed (i.e. when there is reversal of the entire trap), the trap functions in the mode in which there is discharge of condensate having a temperature well below the equilibrium temperature for saturated steam. One or the other of these modes of operation is obtained, in a single steam trap, merely by a reversal of the trap by exchanging inlet and outlet.

BRIEF DESCRIPTION OF THE DRAWINGS

In the drawings, wherein like numerals designate like parts.

DETAILED DESCRIPTION OF THE PREFERRED EMBODIMENT

Figure 1:
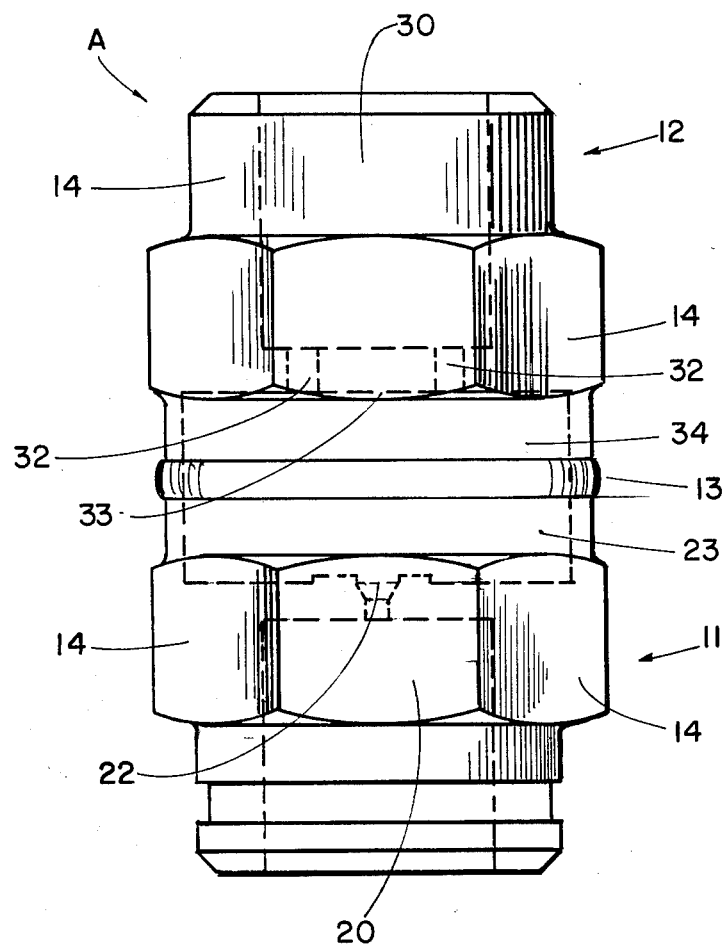
FIG. 1 represents an elevation of a trap embodying the invention.

Referring to FIG. 1, the steam trap shown therein as A is a dual mode bellows-actuated thermostatic steam trap which includes, in this embodiment, a first housing portion 11 and a second housing portion 12. While the two housing portions are shown here joined by a weld 13, they may be variously joined using, for example, threads or flanges. Both housing portions may be provided with octagonal faces 14 which make for ease of pipe fitting and installation. The total mass of the housing portions constitutes at least 70% of the mass of the trap.

First housing portion 11, as particularly seen in FIGS. 2-5, has a passage 20, provided with internal threads 21, extending from its exterior to its interior. This passage terminates in a fixed valve seat 22, which is located on its longitudinal axis at the point where the passage enters the hollow interior 23 (FIG. 1) of the housing portion 11.

Second housing portion 12, as particularly seen in FIGS. 2-5, has a longitudinal passage 30 extending from the exterior toward the interior. At one end, this passage is provided with internal threads 31 so as to provide a connection identical to that provided by the threads 21 in the passage 20. Proximate its other end, passage 30 divides into a pluralilty of smaller offset bores 32, which are radially distributed around the longitudinal axis of the housing. Bores 32 terminate in the hollow interior 34 (FIG. 1) of housing portion 12. Centrally located around the longitudinal axis of the housing, and in general transverse alignment with the termini of bores 32, is a bellows attachment face 33.

When assembled, the two housing portions create an internal chamber 40 within which is provided an elongated bellows, generally 41, having opposed ends 42, 43 interconnected by an accordion side wall 44. This bellows contains a volatile liquid whose saturation curve closely parallels but is a few degrees below that for saturated steam. For example, a fluid may be used whose pressure-temperature relationship closely parallels, but is approximately 10 degrees F. (5.6 deg. C.) below that of steam—(i.e. its boiling point at 0 psig is 202 degrees F. v. water at 212 degrees F.; at 100 psig 328 degrees F. for the fluid v. 338 degrees F. for water). Various alcohols and mixtures thereof may be used, but the preferred liquid is n-propanol.

A valve member 45, shown in this embodiment as hemi-spherical, is centrally mounted on end 42 and is in operative contact with seat 22 when the bellows 41 expands. Bellows end 43 adjoins bellows attachment face 33 and must be secured to it. This is preferably done with pivotal attachment means, so that there will be selfalignment of the valve member and seat as the bellows goes through cycles of expansion and contraction. The illustrated means utilizes a sphere 46, which is suitably affixed to the end 43 at the center thereof. Face 33 is provided with a hollow sleeve 47, having an internal shoulder 48. Sphere 46 fits closely into sleeve 47 and abuts shoulder 48. It may be variously detented in the sleeve, as by crimping the outer sleeve rim after sphere insertion. The sphere is thus rotatably retained. To increase friction, a helical spring 49 is provided, one end of which abuts the sphere. The bellows, sphere and sleeve are pre-assembled and pressed into a hole provided in face 33 as part of a total assembly operation.

Figure 6:
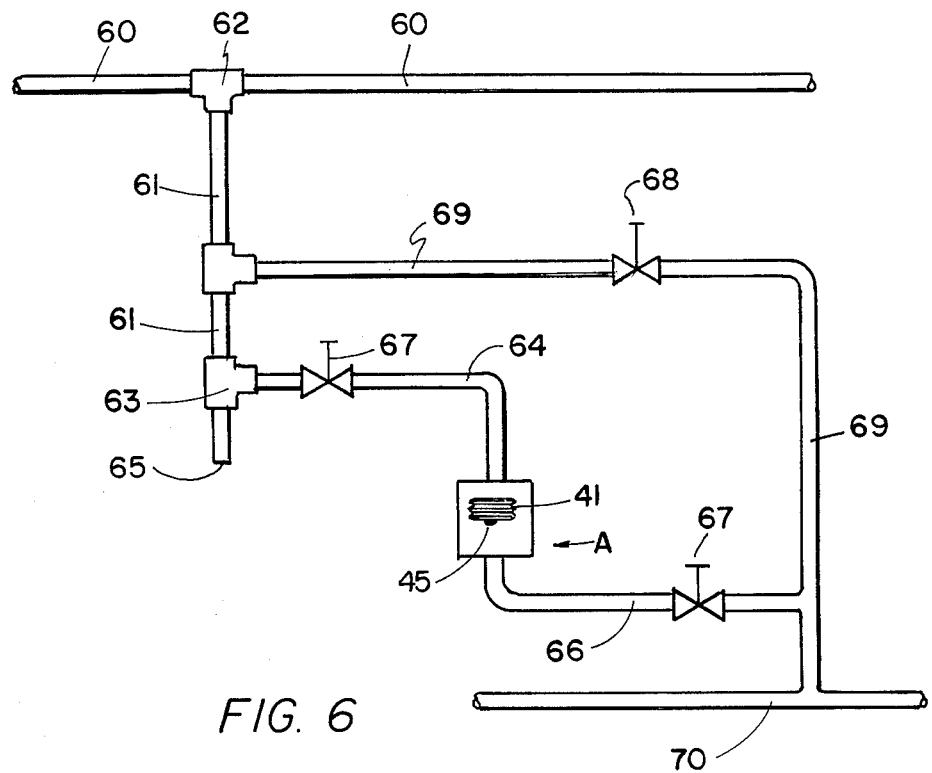
FIG. 6 is a simplified diagramatic representation of the use of the trap in its first mode, in conjunction with a steam main.

Operation of the trap of the invention in a mode in which hot condensate is discharged until the appearance of steam will be explained with reference to FIGS. 2, 3 and 6. Shown in FIG. 6, diagramatically, is a conventional steam main system. This includes a steam main 60 shown running horizontally. A condensate collecting leg 61 drops down from the main and is connected to it with a "T" 62. At the bottom of the collecting leg there is a dirt pocket 65. A "T", 63 links the collecting leg 61 to trap A, via line 64. An outlet line 66 carries condensate from trap A into by-pass line 69 and thence to condensate return line 70. Customary isolation valves 67 are shown in the inlet and outlet lines, and these valves permit the trap to be removed or serviced. Further, a by-pass valve 68 is shown in by-pass line 69. Valves 67 are closed and valve 68 is opened wide on start-up, to allow the steam main to reach desired temperature. Thereafter, when valve 68 is shut and valves 67 are opened, the trap begins to function. Strainers and other customary fittings are not shown, since this type of general arrangement is conventional. Flows through the steam line and the condensate return are indicated by directional arrows.

Figure 3:
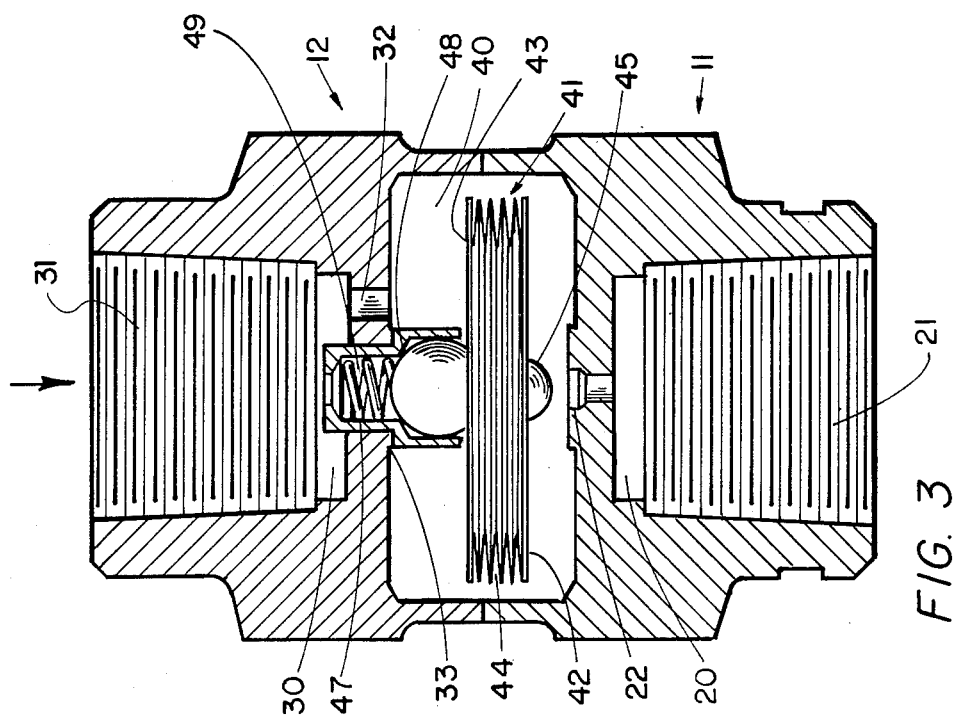
FIG. 3 is a section, identical to that of FIG. 2, except that the trap is shown fully open.
Figure 2:
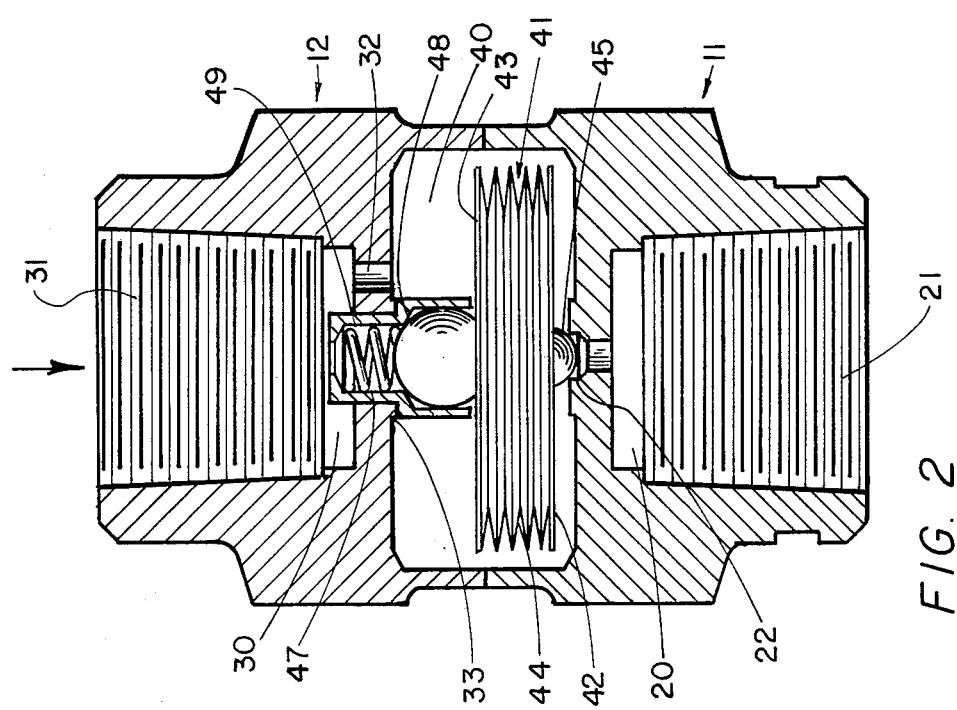
FIG. 2 is a section through the trap of FIG. 1 with a bellows shown in elevation, and with the trap positioned for operation in a first mode, with the trap being shown closed.

In FIGS. 2 and 3, the arrows at the top of passage 30 indicate these same flows. That is, the trap is connected into line 64 such that condensate flows through the passage 30 and into chamber 40 before reaching the "valve" (45 and 22) of the trap. The chamber 40 thus has an environment which is reflective of pressure and temperature conditions in collecting leg 61.

When cold, the trap is wide open, as shown in FIG. 3, freely discharging non-condensables and cool condensate. As the condensate temperature increases, the liquid in the bellows evaporates and generates a significant vapor pressure. When the condensate temperature reaches a few degrees Farenheit (e.g. 10 degrees) below saturated steam temperature, the vapor pressure within the bellows equals the pressure of the condensate in the surrounding chamber. As the condensate temperature increases farther and approaches that of steam, the internal vapor pressure exceeds the external pressure, causing the bellows to expand, driving the valve member 45 toward the seat 22. If steam temperature is reached the valve member is driven tightly into its seat, closing the trap, as shown in FIG. 2. As the condensate surrounding the bellows cools, the vaporized liquid within the bellows condenses, reducing the internal pressure. The bellows contracts, opening the trap for discharge in FIG. 3 configuration. Thus, the thermostatic trap, in this modality, discharges condensate at close to saturation temperature.

Figure 4:
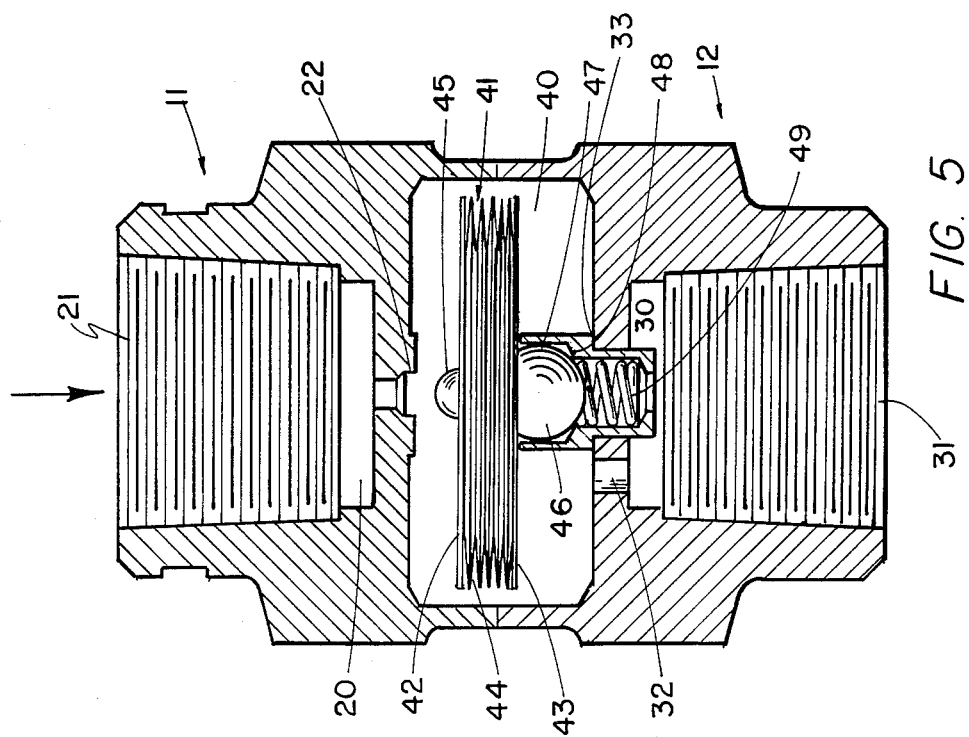
FIG. 4 is a section through the trap, similar to the views of FIGS. 2 and 3, but with the trap reversed for operation in a second mode, the trap being shown throttled down.
Figure 7:
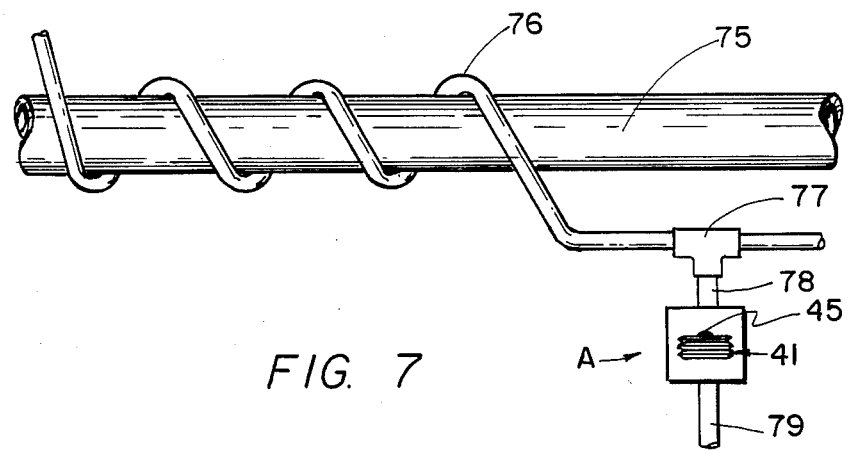
FIG. 7 is a simplified diagramatic representation of the use of the trap in its second mode, in conjunction with a steam traced product line.

Operation of the trap in a mode in which there is modulation of a stream of condensate having a temperature significantly below the equilibrium temperature for saturated steam will now be explained with reference to FIGS. 4, 5 and 7. Shown in FIG. 7 is a conventional, albeit simplified, steam tracing hook-up. A product line 75 is traced with a helical steam tracing line 76 in which, proximate the location of trap A, there is inserted a "T" 77. Line 76 terminates in a drain valve (not shown), downstream of "T" 77. Inlet line 78 connects to the trap and effluent is discharged at atmospheric conditions through line 79. Flows through tracer line 76 are indicated by arrows, as is the discharge direction from line 79. Arrows are also used in FIGS. 4 and 5 to indicate these same flow directions. It is important to note that, in this configuration, "valve" (45 and 22) is interposed between chamber 40 and the steam line. Thus, once the trap is operating, conditions in chamber 40, in particular the pressure in the chamber, are ambient conditions (e.g. atmospheric) rather than line conditions.

Figure 5:
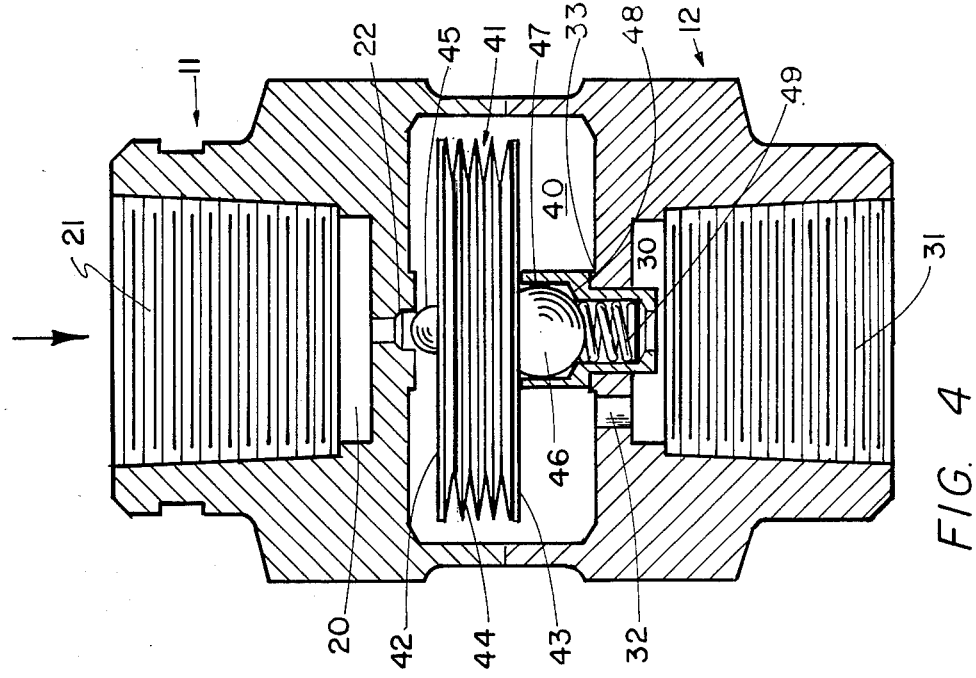
FIG. 5 is a section, identical to that of FIG. 4, except that the trap is shown open.

Upon start up, the trap A is open, as generally shown in FIG. 5, freely discharging noncondensables and cool condensate until the condensate reaches a predetermined temperature below 212 degrees F. (e.g. anywhere from approximately 6 to 20 degrees, depending upon pressure at the trap inlet). As this hot condensate flows over the bellows 41, and it is important that the flow does envelope the bellows, and the liquid in the bellows boils, exerting a pressure which expands the bellows, pushing the valve toward its seat, as shown in FIG. 4, thus throttling flow. Because the surrounding pressure in the chamber 40 is always atmospheric, the bellows 41 always expands at the predetermined temperature below 212 degrees F. irrespective of the condensate line pressure. Flow through the valve (45 and 22) of condensate approaching 212 degrees F., may cause the valve momentarily to close but, because the bellows is downstream of the valve, the bellows is then cut off from its heat source and the valve (45 and 22) begins to open again. Thus there is a continuous search for equilibrium which results in a modulated discharge from the trap (i.e. increased and reduced flow but nearly always some flow) once initial heat-up has occured. This is different from the first mode of operation described above and is attributable to the differences in environment in chamber 40. The valve member movement as between FIGS. 4 and 5 is relatively small, on the order of small fractions of an inch, but such relatively small movement is enough to produce the desired results.

While only one embodiment of the invention has been herein shown and described, it will be apparent to those skilled in the art that the construction and arrangement of parts may be in other ways variously embodied or changed without departing from the scope of the invention as defined in the appended claims.

I claim:

1. A bellows-actuated thermostatic steam trap comprising a metal housing, which constitutes at least 70% of the mass of the trap, within which there is a bellows containing a volatile liquid whose saturation curve closely parallels but is a few degrees below that for saturated steam, and carrying a part of a valve for opening and closing the trap, the bellows being disposed between connections in the housing which are identical to one another, so as to be selectively connectable in a steam flow line with the valve disposed either downstream of, or upstream of, the bellows;

said connections being opposed and adapted for connection in a steam flow line such that when the valve is disposed downstream of the bellows, the valve is below the bellows, whereas when the valve is disposed upstream of the bellows, the valve is above the bellows; and the part of the valve carried by said bellows is a valve member that cooperates with a fixed valve seat; said bellows being elongated and having opposed ends that are interconnected by an accordion side wall; one of the bellows ends carrying the valve member and the other of the bellows ends being pivotally supported for obtaining self-aligning of the valve member with the valve seat upon expansion of the bellows to close the valve;

said metal housing including: (a) a first, generally cylindrical housing portion, having a hollow interior, this housing portion including a passage extending from the exterior to the interior of the housing along the longitudinal axis of the housing and terminating in said fixed valve seat which is located at the point where this passage enters said hollow interior; and (b) a second, generally cylindrical housing portion, also having a hollow interior, mounted in mating co-axial juxtaposition to the first housing portion to define therewith a housing having an internal chamber, the second housing portion being provided with a longitudinal passage extending from the exterior to the interior, and a bellows attachment face located on the longitudinal axis of this second housing portion proximate the terminus of this passage, which passage begins as a single bore and divides into a plurality of smaller offset bores radially distributed about the bellows attachment face;

the trap operating, when connected with the valve disposed downstream of the bellows, in a first mode in which, in normal operation, the trap discharges condensate at a temperature close to saturated steam temperature, whereas when connected with the valve disposed upstream of the bellows, the valve operates in a second mode in which, in normal operation, condensate is discharged at a temperature significantly below steam temperature.

2. A steam trap as claimed in claim 1, wherein said other of the bellows ends has fast therewith a sphere that is permanently but rotatably retained within a hollow, internally shouldered, sleeve mounted on said bellows attachment face.

3. A steam trap as claimed in claim 2, wherein the sleeve also contains a spring, one end of which abuts the sphere to impart frictional resistance to rotation of the sphere in the sleeve.

4. A bellows-actuated thermostatic steam trap, capable of operation in two different modes, comprising:
   (a) a first, generally cylindrical metal housing portion having a hollow interior, said housing portion including—along its longitudinal axis—a passage extending from the exterior thereof to its interior, the interior terminus of said passage being a valve seat;
   (b) a second, generally cylindrical metal housing portion, also having a hollow interior, mounted in mating co-axial juxtaposition to said first housing portion to define therewith a housing having an internal chamber, said second housing portion also including a passage linking its exterior to the interior thereof and terminating at said internal chamber, the total mass of said housing portions constituting at least 70% of the mass of the trap;
   (c) a bellows attachment face in said second housing portion, proximate the terminus of the passage therein;
   (d) a bellows containing a volatile liquid whose saturation curve closely parallels but is a few degrees below that for saturated steam, said bellows having two ends and an accordion side wall, located within the internal chamber formed by said two housing portions;
   (e) pivotal means attaching one end of said bellows to said attachment face comprising a spherical member centrally affixed to the end of the bellows opposite the valve member and a hollow, internally shouldered sleeve mounted on said attachment face, within which said spherical member is permanently but rotatably retained, said sleeve also containing a spring, one end of which abuts said spherical member to create frictional resistance to movement of said member, whereby longitudinal self-alignment of said valve member and said valve seat as the the bellows expands and contracts is assured;
   (f) a valve member mounted on the other end of said bellows in operative juxtaposition with said valve seat which permits flow when said bellows is contracted and throttles flow when said bellows is expanded;

said trap operating in a first mode, in which condensate is discharged at close to saturated steam temperature, when the passage in said second housing portion is used as the inlet to the trap and in a second mode, in which condensate is discharged at a temperature significantly below steam temperature, when the passage in said first housing portion is used as the inlet to the trap.

5. A bellows-actuated thermostatic steam trap, capable of operation in two different modes, comprising:
   (a) a first, generally cylindrical metal housing portion having a hollow interior, said housing portion including—along its longitudinal axis—a passage extending from the exterior thereof to its interior, the interior terminus of said passage being a valve seat;
   (b) a second, generally cylindrical metal housing portion, also having a hollow interior, mounted in mating co-axial juxtaposition to said first housing portion to define therewith a housing having an internal chamber, said second housing portion also including a passage linking its exterior to the interior thereof and terminating at said internal chamber, the total mass of said housing portions constituting at least 70% of the mass of the trap;
   (c) a bellows attachment face in said second housing portion, proximate the terminus of the passage therein, said passage dividing, proximate its terminus, into a plurality of smaller offset bores radially distributed about said attachment face;
   (d) a bellows containing a volatile liquid whose saturation curve closely parallels but is a few degrees below that for saturated steam, said bellows having two ends and an accordion side wall, located within the internal chamber formed by said two housing portions;
   (e) means attaching one end of said bellows to said attachment face;
   (f) a valve member mounted on the other end of said bellows in operative juxtaposition with said valve seat which permits flow when said bellows is contracted and throttles flow when said bellows is expanded;

said trap operating in a first mode, in which condensate is discharged at close to saturated steam temperature, when the passage in said second housing portion is used as the inlet to the trap and in a second mode, in which condensate is discharged at a temperature significantly below steam temperature, when the passage in said first housing portion is used as the inlet to the trap.

6. A steam trap as claimed in claim 5 wherein said means for attaching the bellows is pivotal to assure longitudinal self-alignment of said valve member and said valve seat as the bellows expands and contracts.

* * * * *